(12) United States Patent
Hamel et al.

(10) Patent No.: US 11,583,141 B2
(45) Date of Patent: Feb. 21, 2023

(54) MOUNTABLE TRAYS FOR TEMPERATURE PROBE HUBS

(71) Applicant: Weber-Stephen Products LLC, Palatine, IL (US)

(72) Inventors: Qian Hamel, Palatine, IL (US); Aman Sharma, Round Lake, IL (US); Romualdo Sonny Siazon, Woodstock, IL (US)

(73) Assignee: WEBER-STEPHEN PRODUCTS LLC, Palatine, IL (US)

( * ) Notice: Subject to any disclaimer, the term of this patent is extended or adjusted under 35 U.S.C. 154(b) by 364 days.

(21) Appl. No.: 16/863,072

(22) Filed: Apr. 30, 2020

(65) Prior Publication Data

US 2021/0338010 A1 Nov. 4, 2021

(51) Int. Cl.
A47J 37/07 (2006.01)

(52) U.S. Cl.
CPC ........ *A47J 37/0786* (2013.01); *A47J 2201/00* (2013.01); *A47J 2202/00* (2013.01)

(58) Field of Classification Search
None
See application file for complete search history.

(56) References Cited

U.S. PATENT DOCUMENTS

| D158,138 S | 4/1950 | Simpson |
| 2,529,285 A | 11/1950 | Felton |
| 3,187,923 A | 6/1965 | Christensen |
| 3,260,486 A | 7/1966 | Groff |
| D244,352 S | 5/1977 | Congleton |
| D247,025 S | 1/1978 | Cherry |
| D250,443 S | 12/1978 | Romanoff |
| D255,668 S | 7/1980 | Sidders et al. |
| D256,861 S | 9/1980 | Ryan et al. |
| 4,331,123 A | 5/1982 | Alles et al. |
| 4,337,751 A | 7/1982 | Sampson et al. |
| D272,505 S | 2/1984 | Daenen et al. |
| 4,466,445 A | 8/1984 | Abrams |
| 4,665,888 A | 5/1987 | Christen, Jr. et al. |
| D293,999 S | 2/1988 | Grindrod et al. |

(Continued)

FOREIGN PATENT DOCUMENTS

| TW | 201940851 | 10/2019 |
| TW | 202004140 | 1/2020 |
| WO | 8806868 | 9/1988 |

OTHER PUBLICATIONS

IP Australia, "Certificate of Registration," issued in connection with Australian Patent Application No. 202014602, dated Nov. 9, 2020, 8 pages.

(Continued)

*Primary Examiner* — Jason Lau
(74) *Attorney, Agent, or Firm* — Hanley, Flight & Zimmerman, LLC

(57) ABSTRACT

Mountable trays for temperature probe hubs are disclosed. An example mountable tray includes a central portion, a peripheral portion, and a mounting arm. The central portion includes at least one drainage opening extending through the central portion. The peripheral portion is coupled to and extends upwardly from the central portion. The mounting arm is coupled to and extends upwardly from the peripheral portion. The mounting arm is configured to mount the mountable tray to a flange.

15 Claims, 10 Drawing Sheets

(56) References Cited

U.S. PATENT DOCUMENTS

| | | |
|---|---|---|
| D312,185 S | 11/1990 | Prater, Sr. |
| D314,485 S | 2/1991 | Chap et al. |
| D332,367 S | 1/1993 | McKeone et al. |
| 5,221,006 A | 6/1993 | Plumlee et al. |
| D341,971 S | 12/1993 | Corbin |
| D345,067 S | 3/1994 | Shafer |
| D371,506 S | 7/1996 | Nofziger |
| 5,560,576 A | 10/1996 | Cargill |
| 5,615,504 A | 4/1997 | Peterson et al. |
| D408,682 S | 4/1999 | Costa |
| 5,947,272 A | 9/1999 | Park |
| D432,836 S | 10/2000 | Gastelum et al. |
| D433,858 S | 11/2000 | Gastelum et al. |
| D446,719 S | 8/2001 | Garraway |
| 6,350,089 B1 | 2/2002 | Tekavec |
| D469,249 S | 1/2003 | Cain |
| D484,097 S | 12/2003 | Drane et al. |
| D484,697 S | 1/2004 | McCoy et al. |
| D488,944 S | 4/2004 | Hoernig |
| D493,256 S | 7/2004 | Kim |
| D496,816 S | 10/2004 | Hoernig |
| 6,808,147 B2 | 10/2004 | Brannen et al. |
| D513,171 S | 12/2005 | Richardson |
| D541,044 S | 4/2007 | Wagner, II |
| D543,403 S | 5/2007 | Tau |
| 7,252,274 B1 | 8/2007 | Brannen |
| 7,431,251 B2 | 10/2008 | Carnevali |
| D602,352 S | 10/2009 | Pendergrass et al. |
| D607,198 S | 1/2010 | Andre et al. |
| D620,706 S | 8/2010 | Wagner, II |
| D622,058 S | 8/2010 | Wagner, II |
| D638,137 S | 5/2011 | Gross et al. |
| D655,575 S | 3/2012 | Ruzika |
| D667,249 S | 9/2012 | London |
| 8,333,285 B2 | 12/2012 | Kiehnau et al. |
| D682,682 S | 5/2013 | Biery |
| D699,097 S | 2/2014 | Chung et al. |
| D727,657 S | 4/2015 | Lim |
| D727,791 S | 4/2015 | Montagano |
| D733,772 S | 7/2015 | Kim et al. |
| D754,533 S | 4/2016 | Afford et al. |
| D759,958 S | 6/2016 | Requa |
| D761,614 S | 7/2016 | Zemel et al. |
| D770,232 S | 11/2016 | Brown et al. |
| 9,587,990 B2 | 3/2017 | McCord |
| 9,634,711 B2 | 4/2017 | Sirichai |
| 9,847,805 B2 | 12/2017 | Sirichai |
| D806,381 S | 1/2018 | Yu |
| D821,743 S | 7/2018 | Cao |
| D826,044 S | 7/2018 | Jefferies |
| D824,692 S | 8/2018 | Kwiatkowski et al. |
| 10,067,004 B1 | 9/2018 | Allen |
| D839,078 S | 1/2019 | Stahl et al. |
| D848,731 S | 5/2019 | Ge |
| 10,304,429 B1 | 5/2019 | Broadbelt et al. |
| D852,793 S | 7/2019 | Zhou |
| 10,362,855 B2 | 7/2019 | Whang et al. |
| D859,031 S | 9/2019 | Ritch |
| D863,040 S | 10/2019 | Dedios-Shirley et al. |
| D865,487 S | 11/2019 | Dedios-Shirley et al. |
| D886,569 S | 6/2020 | Vlad et al. |
| D887,890 S | 6/2020 | Liu |
| D891,777 S | 8/2020 | Newton |
| D906,095 S | 12/2020 | Dedios-Shirley et al. |
| D931,058 S | 9/2021 | Hamilton |
| D931,711 S | 9/2021 | Sharma et al. |
| D932,234 S | 10/2021 | McKenzie |
| D942,214 S | 2/2022 | Hamel et al. |
| 2002/0136263 A1 | 9/2002 | Wilkins |
| 2006/0070613 A1 | 4/2006 | Cummings et al. |
| 2009/0139132 A1* | 6/2009 | Knight ................. A01K 97/04 43/54.1 |
| 2011/0248531 A1* | 10/2011 | Powell .................. A47C 1/11 297/163 |
| 2018/0177335 A1 | 6/2018 | Polaczek et al. |
| 2018/0224337 A1 | 8/2018 | Nagasaka et al. |
| 2018/0338351 A1 | 11/2018 | Schmeski |
| 2018/0372555 A1 | 12/2018 | Allen, Sr. |

OTHER PUBLICATIONS

IP Australia, "Certificate of Examination," issued in connection with Australian Patent Application No. 202014602, dated Apr. 7, 2021, 2 pages.

China National Intellectual Property Administration, "Notice of Grant," issued in connection with Chinese Patent Application No. 202030530918.3, dated Jan. 28, 2021, 5 pages.

China National Intellectual Property Administration, "Design Certificate," issued in connection with Chinese Patent No. ZL 202030530918.3, dated Mar. 9, 2021, 3 pages.

European Union Intellectual Property Office, "Certificate of Registration No. 008160139-0001," issued on Sep. 11, 2020, 4 pages.

United States Patent and Trademark Office, "Notice of Allowance and Fee(s) Due," issued in connection with U.S. Appl. No. 29/733,234, dated Oct. 5, 2021, 8 pages.

Canadian Intellectual Property Office, "Notice of Registration," issued in connection with Canadian Patent Application No. 198026, dated Mar. 7, 2022, 9 pages.

International Searching Authority, "International Search Report and Written Opinion," issued in connection with International Patent Application No. PCT/US2020/047209, dated Jan. 27, 2021, 7 pages.

United States Patent and Trademark Office, "Notice of Allowance and Fee(s) Due," issued in connection with U.S. Appl. No. 29/791,181, dated May 27, 2022, 8 pages.

Weber, "Charcoal Grill Replacement Parts—iGrill Bracket," dated 2020, 4 pages.

Taiwan Intellectual Property Office, "Office Action and Search Report," issued in connection with Taiwan Patent Application No. 110100622, dated Jun. 6, 2022, 13 pages.

International Bureau, "International Preliminary Report on Patentablity," issued in connection with International Patent Application No. PCT/US2020/047209, dated Nov. 10, 2022, 6 pages.

Taiwan Intellectual Property Office, "Decision of Rejection" issued in connection with Taiwan Patent Application No. 110100622, dated Oct. 17, 2022, 3 pages. (Non-certified machine translation provided).

* cited by examiner

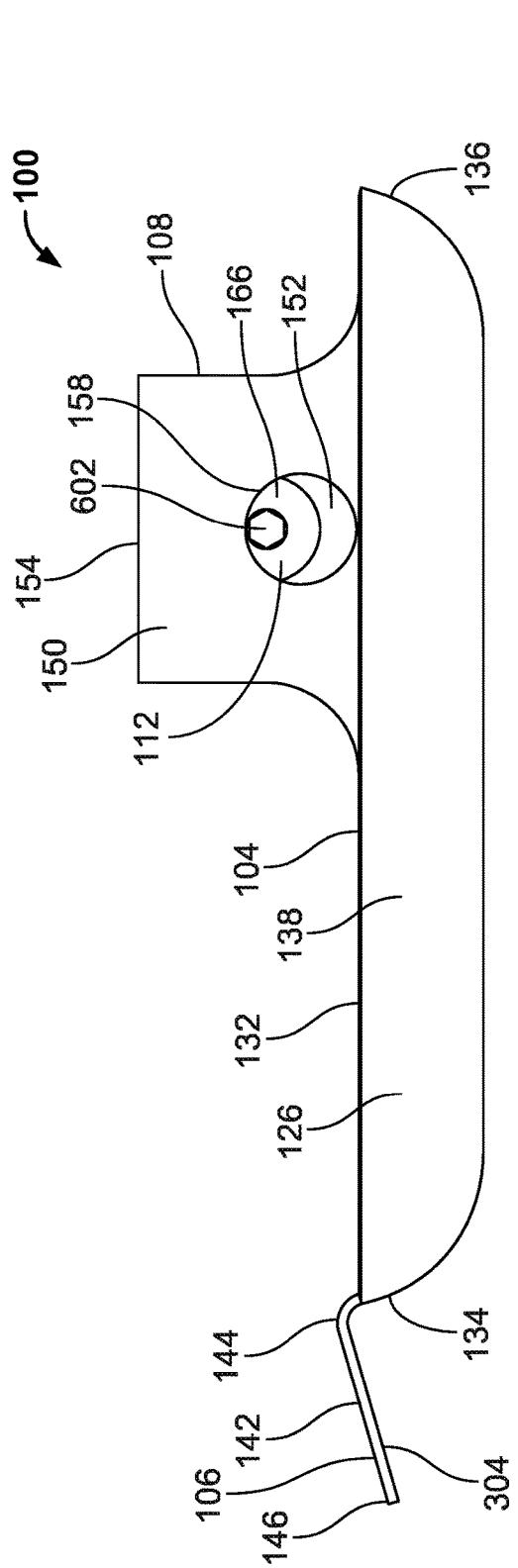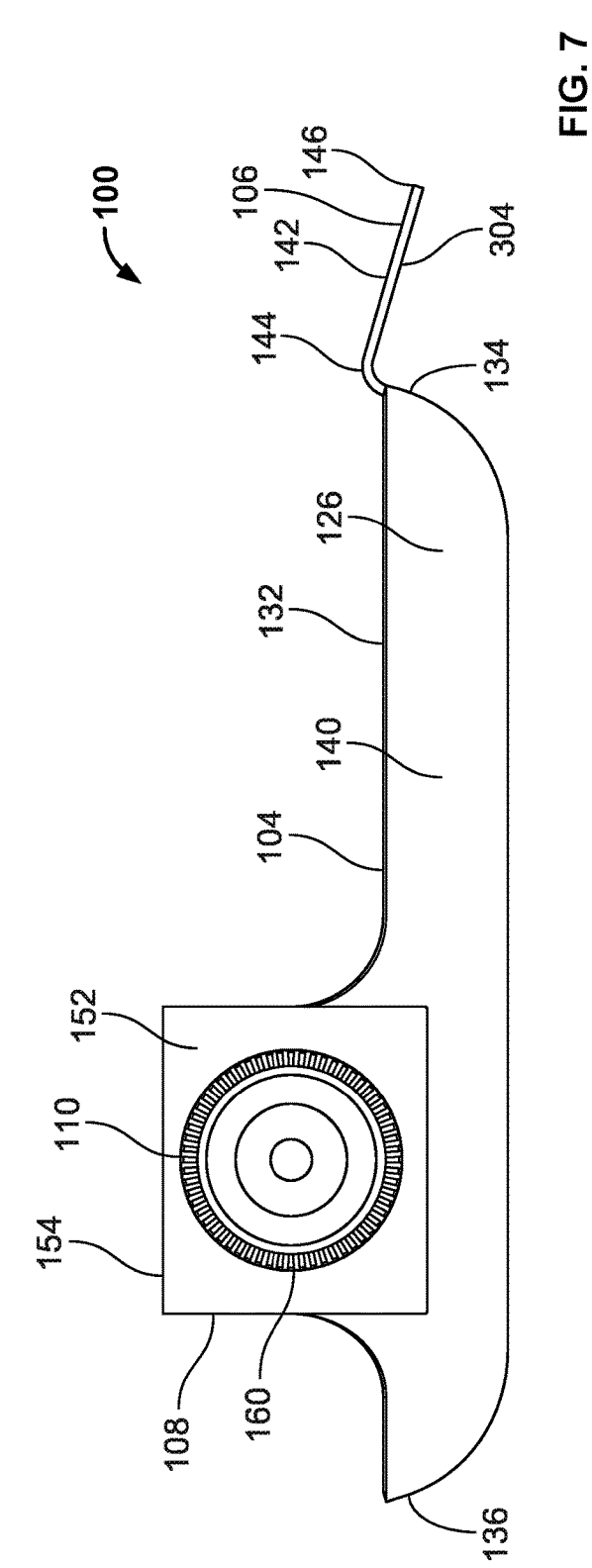

SECTION A-A

MOUNTABLE TRAYS FOR TEMPERATURE PROBE HUBS

FIELD OF THE DISCLOSURE

This disclosure relates generally to mountable trays and, more specifically, to mountable trays for temperature probe hubs.

BACKGROUND

A temperature probe may be used to sense and/or measure the temperature of a food item as the food item is actively being cooked. For example, a temperature probe inserted into a piece of meat may sense and/or measure the temperature of the meat as the meat is cooked via heat generated by a cooking device (e.g., an outdoor grill, an outdoor smoker, etc.). The temperature probe may include and/or be connected to a probe cable, and the probe cable may include and/or be connected to a jack plug configured to be plugged into a jack of a temperature probe hub.

When the temperature probe is connected to the temperature probe hub, temperature data sensed and/or measured by the temperature probe may be presented on a display of the temperature probe hub for viewing by an end user. The temperature data may additionally or alternatively be wirelessly transmitted from the temperature probe hub to a remotely located computing and/or communication device (e.g., a smartphone, a tablet, a laptop computer, a desktop computer, a server, a wireless access point, etc.) which may subsequently process, display, and/or further transmit the received temperature data or some derivation thereof.

Some temperature probe hubs are equipped with a base (e.g., a base having a generally flat and/or generally planar bottom) that facilitates placing the temperature probe hub on top of a horizontally-oriented surface of a cooking device with which the temperature probe hub is to be used. For example, a temperature probe hub can include a base that facilitates placing the temperature probe hub on top of a horizontally-oriented side table of an outdoor grill with which the temperature probe hub is to be used. In such implementations, it is generally preferable that the temperature probe hub be placed on top of a horizontally-oriented surface that is not a cooking chamber surface of the cooking device, as the cooking chamber surfaces of the cooking device may reach a temperature (e.g., during use of the cooking device) to which the temperature probe hub is preferably not directly exposed.

Many cooking devices are equipped with at least one surface that is horizontally-oriented and that is not a cooking chamber surface. For example, many outdoor grills are equipped with a side table having a horizontally-oriented surface (e.g., a top surface of the side table) that is not a cooking chamber surface, thereby providing an ideal candidate for placement of the temperature probe hub. Other cooking devices, however, may be deficient in this regard. For example, a cooking device may lack a side table of any form, and the only horizontally-oriented surface of the cooking device may be a cooking chamber surface. As another example, a cooking device may lack a side table of any form, and may further lack a horizontally-oriented surface of any form.

Some temperature probe hubs are equipped with a magnet (e.g., embedded within a housing of the temperature probe hub) that is configured to removably (e.g., magnetically) couple the temperature probe hub, in any orientation, to a ferromagnetic surface of a cooking device. For example, a temperature probe hub can include a magnet configured to removably couple the temperature probe hub, in any orientation, to a ferromagnetic surface of an outdoor grill, as may be provided by a side table of the outdoor grill. In such implementations, it is generally preferable that the temperature probe hub be magnetically coupled to a flat (e.g., planar) ferromagnetic surface, as magnetically coupling the temperature probe hub to a curved (e.g., non-planar) ferromagnetic surface may reduce the effectiveness (e.g., the holding strength) of the magnetic coupling, particularly when the extent of the curvature of the curved surface is significant. It is also generally preferable that the temperature probe hub be magnetically coupled to a ferromagnetic surface that is not a cooking chamber surface of the cooking device, as the cooking chamber surfaces of the cooking device may reach a temperature (e.g., during use of the cooking device) to which the temperature probe hub is preferably not directly exposed.

Many cooking devices are equipped with at least one ferromagnetic surface that is flat and that is not a cooking chamber surface. For example, many outdoor grills are equipped with a ferromagnetic side table having at least one flat surface that is not a cooking chamber surface. In most instances, the flat surface(s) of the ferromagnetic side table is/are ideal for magnetically coupling the temperature probe hub thereto. Other cooking devices, however, may be deficient in this regard. For example, a cooking device may lack a ferromagnetic side table of any form, and the only flat ferromagnetic surface of the coking device may be a cooking chamber surface. As another example, a cooking device may lack a ferromagnetic side table of any form, and may further lack a flat ferromagnetic surface of any form.

BRIEF DESCRIPTION OF THE DRAWINGS

FIG. 6 is a first side view of the mountable tray of FIGS. 1-5.

FIG. 7 is a second side view of the mountable tray of FIGS. 1-6.

Figure 1:
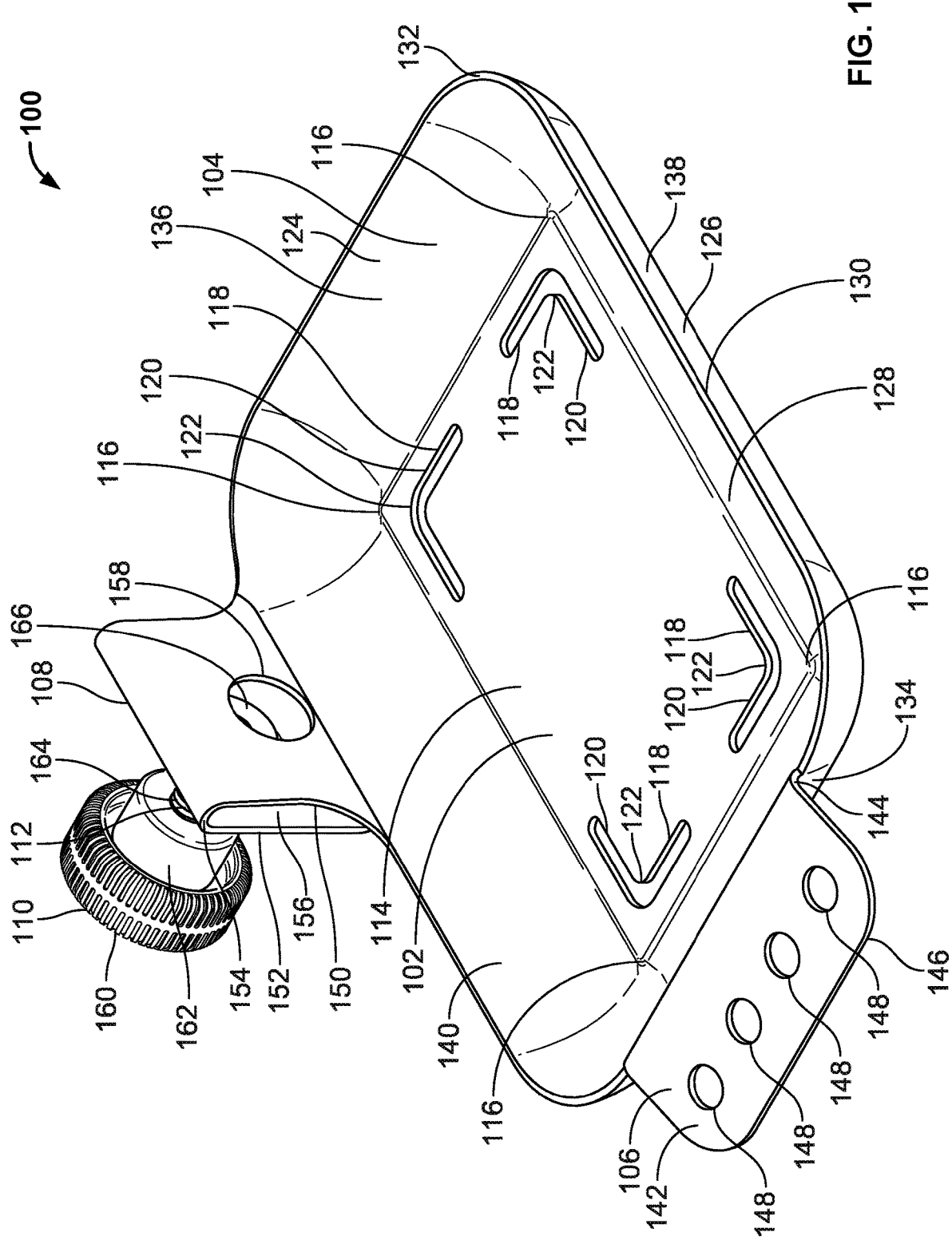
FIG. 1 is a first perspective view of an example mountable tray constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example mountable trays disclosed herein are configured to removably couple a temperature probe hub to a cooking device (e.g., an outdoor grill, an outdoor smoker, etc.) in instances where such a removable coupling would otherwise be infeasible due to the shape, configuration, and/or material properties of the cooking device, and/or due to the shape and/or configuration of the temperature probe hub. In some examples, mountable trays disclosed herein advantageously include a mounting arm configured to mount the mountable tray to a flange of a bracket, with the bracket in turn being mountable to a component (e.g., a handle, a flange, a housing, a cooking chamber, etc.) of a cooking device.

In some examples, mountable trays disclosed herein advantageously include a central portion having one or more drainage opening(s) (e.g., one or more through hole(s)) extending therethrough. In such examples, the drainage opening(s) is/are configured to drain fluid (e.g., rainwater, spilled liquid, etc.) from the central portion and/or, more generally, from the mountable tray. In such examples, the drainage opening(s) advantageously prevent(s) fluid deposited onto the central portion and/or within the mountable tray from collecting within the mountable tray.

In some examples, mountable trays disclosed herein advantageously include a probe storage tab having one or more probe storage opening(s) (e.g., one or more through hole(s)) extending therethrough. In such examples, each probe storage opening is configured to receive a temperature probe of a temperature probe hub, and to prevent the received temperature probe from sliding through the probe storage opening. In such examples, each probe storage opening is advantageously configured to suspend and/or hold the received temperature probe within the probe storage tab. In the absence of the probe storage tab of the mountable tray, the temperature probe may otherwise be left to dangle and/or hang from the temperature probe hub when the temperature probe is coupled to the temperature probe hub and not in use.

The above-identified features as well as other advantageous features of example mountable trays disclosed herein are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object.

Figure 2:
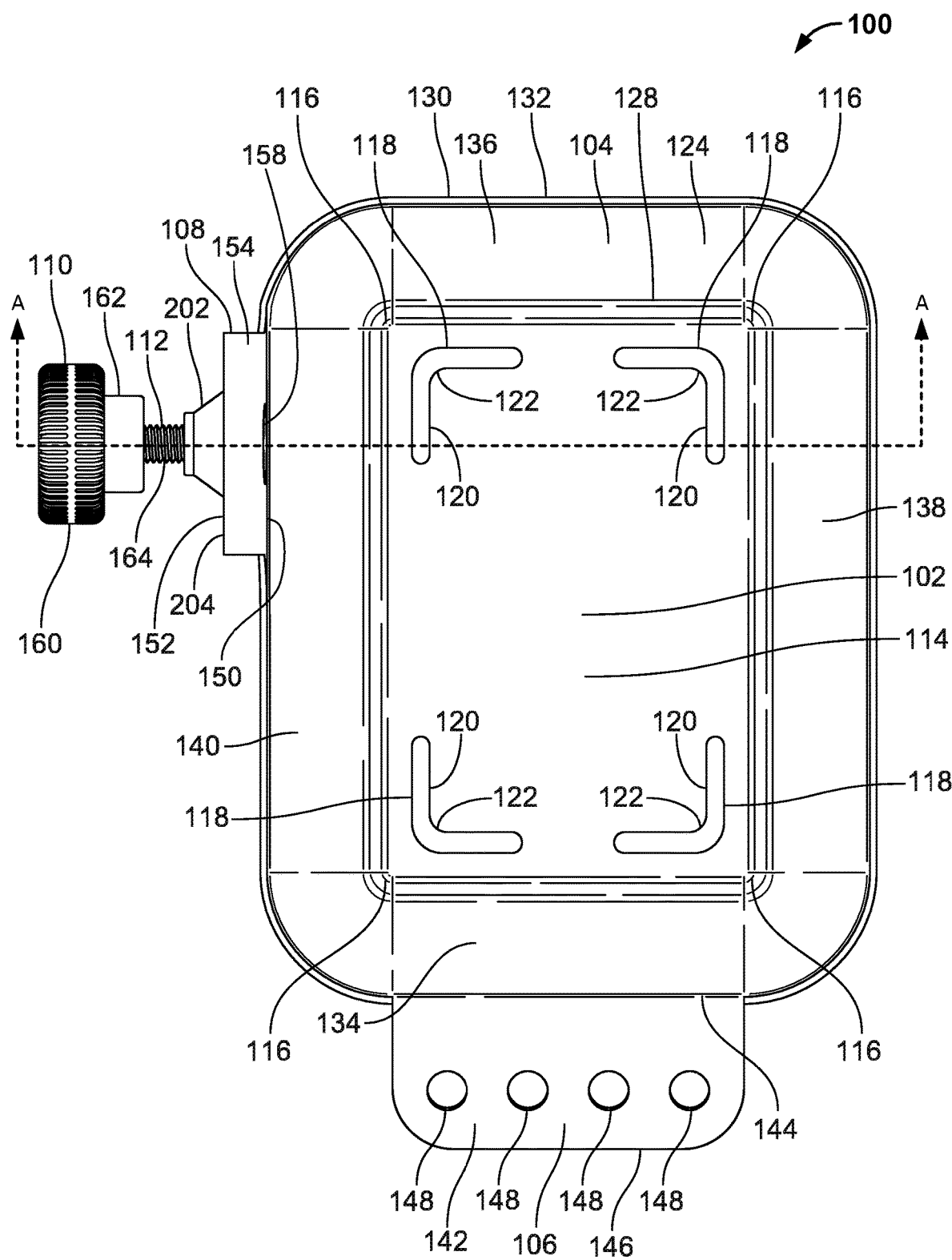
FIG. 2 is a top view of the mountable tray of FIG. 1.
Figure 3:
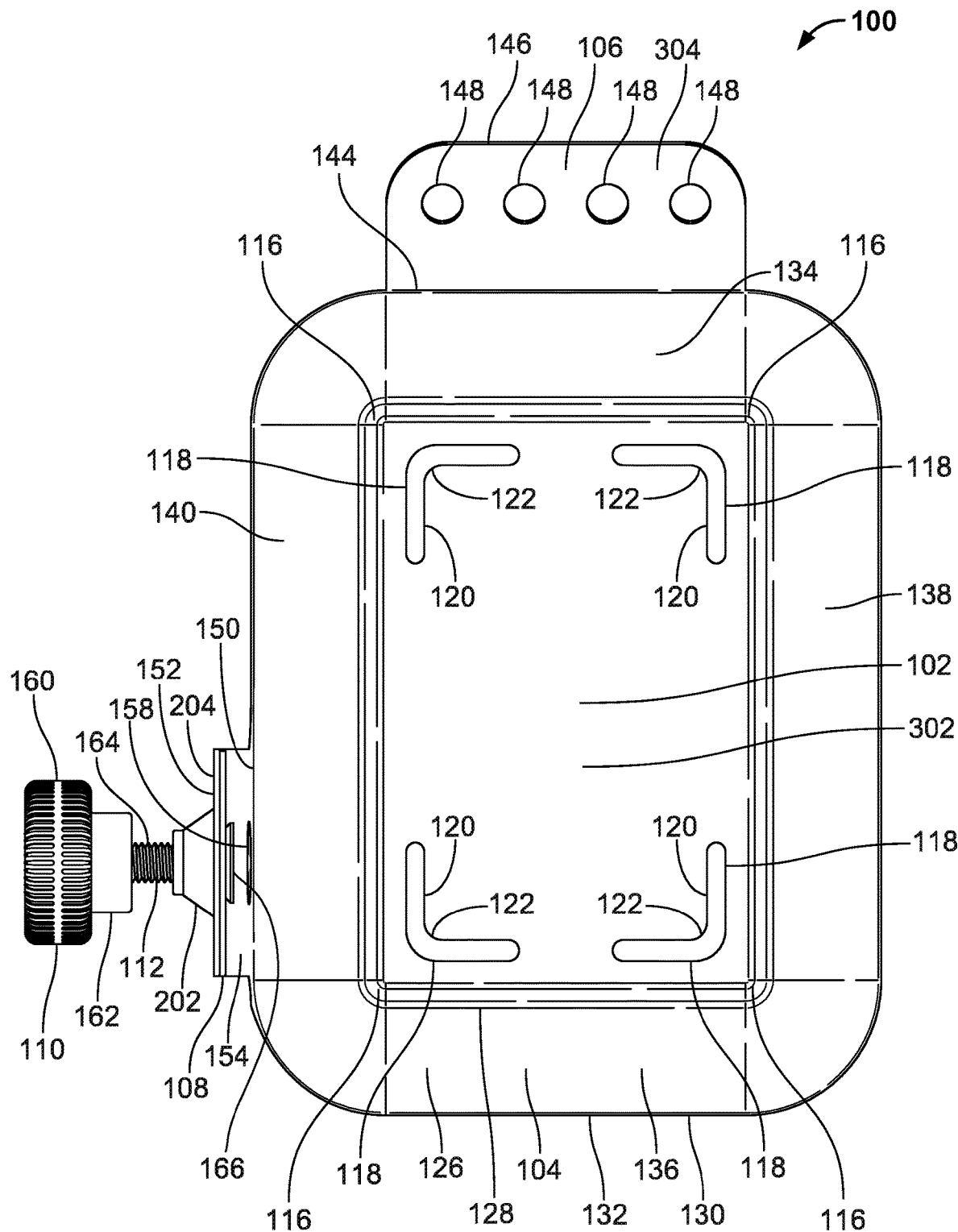
FIG. 3 is a bottom view of the mountable tray of FIGS. 1 and 2.
Figure 4:
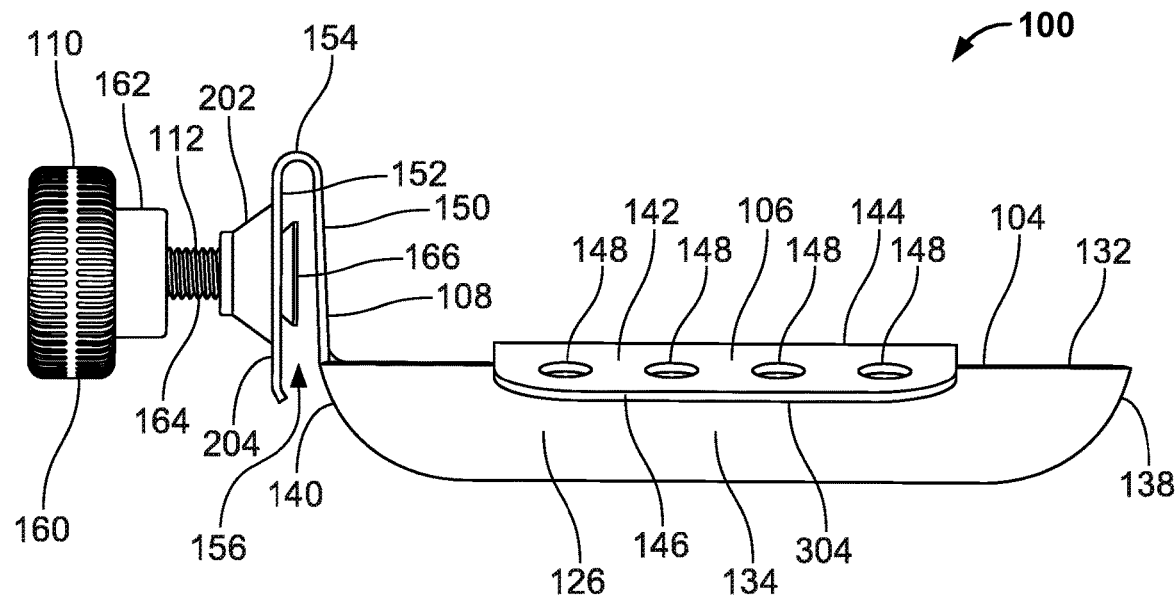
FIG. 4 is a first end view of the mountable tray of FIGS. 1-3.
Figure 5:
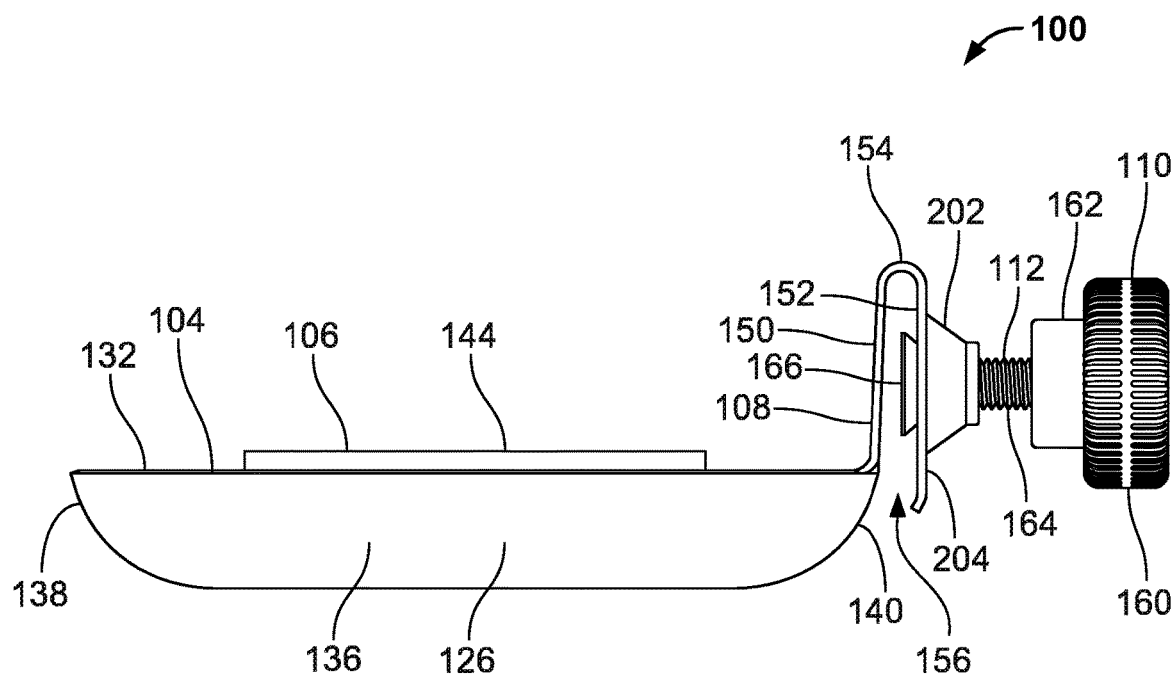
FIG. 5 is a second end view of the mountable tray of FIGS. 1-4.
Figure 8:
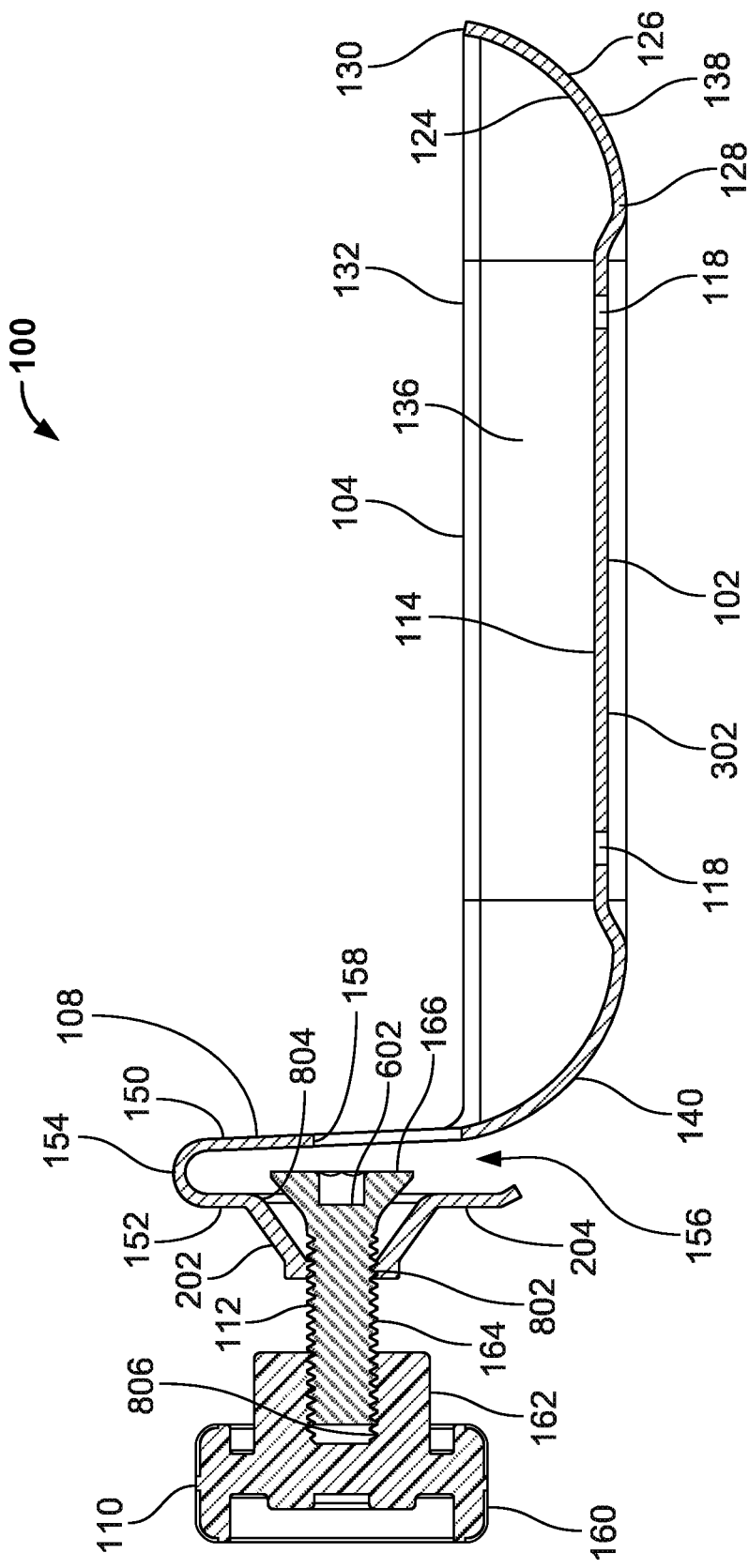
FIG. 8 is a cross-sectional view of the mountable tray of FIGS. 1-7 taken along section A-A of FIG. 2.

FIG. 1 is a first perspective view of an example mountable tray 100 constructed in accordance with teachings of this disclosure. FIG. 2 is a top view of the mountable tray 100 of FIG. 1. FIG. 3 is a bottom view of the mountable tray 100 of FIGS. 1 and 2. FIG. 4 is a first (e.g., front) end view of the mountable tray 100 of FIGS. 1-3. FIG. 5 is a second (e.g., rear) end view of the mountable tray 100 of FIGS. 1-4. FIG. 6 is a first (e.g., right) side view of the mountable tray 100 of FIGS. 1-5. FIG. 7 is a second (e.g., left) side view of the mountable tray 100 of FIGS. 1-6. FIG. 8 is a cross-sectional view of the mountable tray 100 of FIGS. 1-7 taken along section A-A of FIG. 2.

In the illustrated example of FIGS. 1-8, the mountable tray 100 of FIGS. 1-8 includes an example central portion 102, an example peripheral portion 104, an example probe storage tab 106, an example mounting arm 108, an example knob 110, and an example fastener 112. In other examples, the mountable tray 100 can include one or more additional structure(s) and/or component(s) beyond those shown and described in connection with FIGS. 1-8. In still other examples, the mountable tray 100 can omit one or more structure(s) and/or component(s) relative to those shown and described in connection with FIGS. 1-8.

The central portion 102 of the mountable tray 100 of FIGS. 1-8 is configured (e.g., sized, shaped, and/or structured) to support a temperature probe hub. The central portion 102 includes an example upper surface 114 and an example lower surface 302 located opposite the upper surface 114. The upper surface 114 of the central portion 102 forms a support surface for a temperature probe hub (e.g., the temperature probe hub 900 of FIG. 9) that may be placed and/or positioned onto and/or within the mountable tray 100, as further described below. In some examples, the upper surface 114 and/or, more generally, the central portion 102 of the mountable tray 100 has ferromagnetic properties that facilitate the formation of a magnetic coupling between the temperature probe hub and the mountable tray 100.

In the illustrated example of FIGS. 1-8, the central portion 102 has a rectangular profile including example corners 116, with the corners 116 being rounded in shape. In other examples, the corners 116 of the rectangular profile of the central portion 102 can be straight or tapered instead of being rounded. In still other examples, the central portion 102 can have a non-rectangular profile. For example, the central portion 102 can alternatively have a circular profile, an elliptical profile, a triangular profile, a trapezoidal profile, a pentagonal profile, a hexagonal profile, etc. In examples where the profile of the central portion 102 has corners, the corners can be of any type and/or shape (e.g., straight, rounded, tapered, etc.). In some examples, the rectangular profile of the central portion 102 of the mountable tray 100 of FIGS. 1-8 is configured (e.g., sized, shaped, and/or structured) to compliment a rectangular profile of a central portion of a base of a temperature probe hub that is to be placed above, over, and/or onto the upper surface 114 of the central portion 102 of the mountable tray 100.

The central portion 102 of FIGS. 1-8 further includes example drainage openings 118 (e.g., through holes) extending from the upper surface 114 of the central portion 102 through to the lower surface 302 of the central portion 102. The drainage openings 118 are individually and/or collectively configured (e.g., sized, shaped, and/or structured) to drain fluid (e.g., rainwater, spilled liquid, etc.) from the central portion 102 and/or, more generally, from the mountable tray 100. The drainage openings 118 accordingly prevent fluid deposited onto the central portion 102 and/or within the mountable tray 100 from collecting within the mountable tray 100. In the illustrated example of FIGS. 1-8, the central portion 102 includes a total of four drainage openings 118, with respective ones of the drainage openings 118 being located proximate and/or adjacent a corresponding respective one of the four corners 116 of the central portion 102. In other examples, the central portion 102 can include a different number (e.g., 1, 2, 3, 5, 6, 8, 10, etc.) of drainage openings 118. Furthermore, the respective locations and/or positions of the drainage openings 118 can differ relative to those shown in FIGS. 1-8. For example, one or more of the drainage openings 118 can be located more centrally on the central portion 102 (e.g., further away from and/or less proximate the corners 116 of the central portion 102) relative to the respective locations and/or positions of the drainage openings 118 shown in FIGS. 1-8.

In the illustrated example of FIGS. 1-8, each one of the drainage openings 118 is configured (e.g., sized, shaped, and/or structured) as a slot. More specifically, each one of the drainage openings 118 is configured as an example L-shaped slot 120 having an example corner 122. As shown in FIGS. 1-8, the four L-shaped slots 120 are respectively configured (e.g., located, positioned, and/or arranged) such that the corner 122 of each L-shaped slot 120 is oriented toward a corresponding one of the four corners 116 of the central portion 102. Thus, for a first one of the L-shaped slots 120 located proximate and/or adjacent a corresponding first one of the corners 116 of the central portion 102, the corner 122 of the first one of the L-shaped slots 120 is oriented toward the corresponding first one of the corners 116 of the central portion 102. Similar relationships and/or orientations exists between a second one of the L-shaped slots 120 and a corresponding second one of the corners 116 of the central portion 102, between a third one of the L-shaped slots 120 and a corresponding third one of the corners 116 of the central portion 102, and between a fourth one of the L-shaped slots 120 and a corresponding fourth one of the corners 116 of the central portion 102, as can be seen in FIGS. 2 and 3.

The peripheral portion 104 of the mountable tray 100 of FIGS. 1-8 is coupled to and extends upwardly from the central portion 102 of the mountable tray 100. In the illustrated example of FIGS. 1-8, the peripheral portion 104 of the mountable tray 100 is integrally formed with the central portion 102 of the mountable tray 100 such that no joints, seams, and/or welds exist between the peripheral portion 104 and the central portion 102, and/or such that the peripheral portion 104 cannot be removed and/or separated from the central portion 102 absent destructive measures. In other examples, the peripheral portion 104 can alternatively be coupled to the central portion 102 via one or more permanent, temporary, and/or removable mechanical fasteners(s), adhesive(s), and/or bonding agent(s).

The peripheral portion 104 of FIGS. 1-8 circumscribes the central portion 102 of the mountable tray 100. The peripheral portion 104 is configured (e.g., sized, shaped, and/or structured) to circumscribe a temperature probe hub (e.g., the temperature probe hub 900 of FIG. 9) when the temperature probe hub is positioned above, over, and/or onto on the upper surface 114 of the central portion 102, thereby preventing the temperature probe hub from sliding off of the upper surface 114 of the central portion 102. The peripheral portion 104 includes an example inner surface 124 and an example outer surface 126 located opposite the inner surface 124. The inner surface 124 of the peripheral portion 104 forms a retaining surface that prevents a temperature probe hub (e.g., the temperature probe hub 900 of FIG. 9) placed onto and/or within the inner surface 124 of the peripheral portion 104 of the mountable tray 100 from sliding off of and/or out of the mountable tray 100.

The peripheral portion 104 of FIGS. 1-8 further includes an example base end 128 at which the peripheral portion 104 joins and/or meets with the central portion 102 of the mountable tray 100. The peripheral portion 104 also includes an example free end 130 located opposite the base end 128 of the peripheral portion 104. The free end 130 of the peripheral portion 104 forms an example rim 132 of the peripheral portion 104. The free end 130 and/or the rim 132 of the peripheral portion 104 is/are generally oriented in an upward direction relative to the upper surface 114 of the central portion 102. In some examples, the free end 130 of the peripheral portion 104 is oriented at an angle of approximately ninety degrees relative to a plane defined by the upper surface 114 of the central portion 102. In other examples, the free end of the peripheral portion 104 can be oriented at an angle greater than ninety degrees and less than one-hundred eighty degrees relative to a plane defined by the upper surface 114 of the central portion 102.

In the illustrated example of FIGS. 1-8, the peripheral portion 104 is formed by an example first (e.g., front) wall 134, an example second (e.g., rear) wall 136, an example third (e.g., right side) wall 138, and an example fourth (e.g., left side) wall 140, each of which extends upwardly from the central portion 102 of the mountable tray 100. As shown in FIGS. 1-8, the second wall 136 is located opposite the first wall 134. The third wall 138 extends between the first wall 134 and the second wall 136. The fourth wall 140 is located opposite the third wall 138, and extends between the first wall 134 and the second wall 136. In the illustrated example of FIGS. 1-8, the first wall 134, the second wall 136, the third wall 138, the fourth wall 140, and/or, more generally, the peripheral portion 104 has/have a curved and/or contoured profile. In other examples, the first wall 134, the second wall 136, the third wall 138, the fourth wall 140, and/or, more generally, the peripheral portion 104 can instead have a straight and/or linear profile. In some examples, the curved and/or contoured profile of the peripheral portion 104 of the mountable tray 100 of FIGS. 1-8 is/are configured (e.g., sized, shaped, and/or structured) to compliment a curved and/or contoured profile of a peripheral portion of a base of a temperature probe hub that is to be placed onto and/or within the inner surface 124 of the peripheral portion 104 of the mountable tray 100.

The probe storage tab 106 of the mountable tray 100 of FIGS. 1-8 is coupled to and extends outwardly from the peripheral portion 104 of the mountable tray 100. In the illustrated example of FIGS. 1-8, the probe storage tab 106 of the mountable tray 100 is integrally formed with the peripheral portion 104 of the mountable tray 100 such that no joints, seams, and/or welds exist between the probe storage tab 106 and the peripheral portion 104, and/or such that the probe storage tab 106 cannot be removed and/or separated from the peripheral portion 104 absent destructive measures. In other examples, the probe storage tab 106 can alternatively be coupled to the peripheral portion 104 via one or more permanent, temporary, and/or removable mechanical fasteners(s), adhesive(s), and/or bonding agent(s). In the illustrated example of FIGS. 1-8, the probe storage tab 106 is coupled to and extends outwardly from the first wall 134 of the peripheral portion 104 of the mountable tray 100. In other examples, the probe storage tab 106 can instead be coupled to and extend outwardly from the second wall 136, the third wall 138, or the fourth wall 140 of the peripheral portion 104 of the mountable tray 100.

Figure 9:
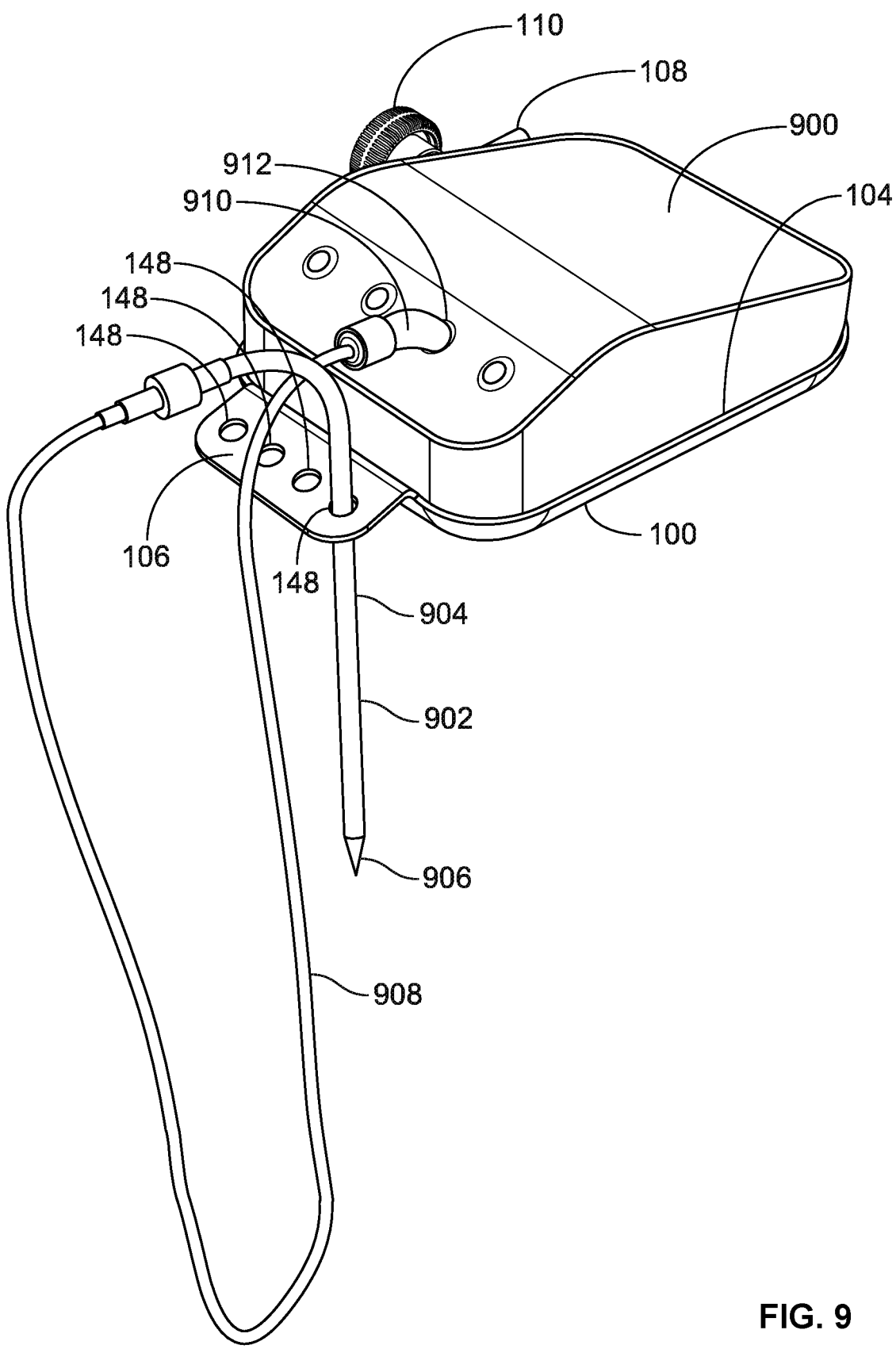
FIG. 9 is a perspective view of the mountable tray of FIGS. 1-8 holding an example temperature probe hub.

The probe storage tab 106 of FIGS. 1-8 is configured (e.g., sized, shaped, and/or structured) to support one or more temperature probe(s) of a temperature probe hub (e.g., the temperature probe hub 900 of FIG. 9). The probe storage tab 106 includes an example upper surface 142 and an example lower surface 304 located opposite the upper surface 142. In the illustrated example of FIGS. 1-8, the probe storage tab 106 has a rectangular profile. In other examples, the probe storage tab 106 can have a non-rectangular profile. For example, the probe storage tab 106 can alternatively have a circular profile, an elliptical profile, a triangular profile, a trapezoidal profile, a pentagonal profile, a hexagonal profile, etc.

The probe storage tab 106 of FIGS. 1-8 further includes an example base end 144 at which the probe storage tab 106 joins and/or meets with the peripheral portion 104 of the mountable tray 100. The probe storage tab 106 also includes an example free end 146 located opposite the base end 144. In the illustrated example of FIGS. 1-8, the base end 144 of the probe storage tab 106 joins and/or meets the free end 130 and/or the rim 132 of the peripheral portion 104. In other examples, the base end 144 of the probe storage tab 106 can instead join and/or meet a different part, portion, and/or segment of the peripheral portion 104. For example, the base end 144 of the probe storage tab 106 can join and/or meet a part, portion, and/or segment of the peripheral portion 104 located adjacent the base end 128 of the peripheral portion 104. As another example, the base end 144 of the probe storage tab 106 can join and/or meet a part, portion, and/or segment of the peripheral portion 104 located midway between the base end 128 and the free end 130 of the peripheral portion 104.

The free end 146 of the probe storage tab 106 is generally oriented in an outward direction relative to the outer surface 126 of the peripheral portion 104. In some examples, the upper surface 142 of the probe storage tab 106 is oriented at a downward angle of approximately twenty degrees toward a plane defined by the upper surface 114 of the central portion 102. In other examples, the upper surface 142 of the probe storage tab 106 can be oriented at a downward angle between zero degrees and ninety degrees toward a plane defined by the upper surface 114 of the central portion 102. In still other examples, the upper surface 142 of the probe storage tab 106 can be oriented at an upward angle (e.g., instead of a downward angle) between zero degrees and ninety degrees away from a plane defined by the upper surface 114 of the central portion 102.

The probe storage tab 106 of FIGS. 1-8 further includes example probe storage openings 148 (e.g., through holes) extending from the upper surface 142 of the probe storage tab 106 through to the lower surface 304 of the probe storage tab 106. Each probe storage opening 148 is configured (e.g., sized, shaped, and/or structured) to receive a temperature probe of a temperature probe hub (e.g., a temperature probe of the temperature probe hub 900 of FIG. 9), and to prevent the received temperature probe from sliding through the probe storage opening 148. Each probe storage opening 148 is accordingly configured (e.g., sized, shape, and/or structured) to suspend and/or hold a temperature probe within the probe storage tab 106. In the illustrated example of FIGS. 1-8, the probe storage tab 106 includes a total of four probe storage openings 148. In other examples, the probe storage tab 106 can include a different number (e.g., 1, 2, 3, 5, 6, etc.) of probe storage openings 148. Furthermore, the respective locations and/or positions of the probe storage openings 148 can differ relative to those shown in FIGS. 1-8.

The mounting arm 108 of the mountable tray 100 of FIGS. 1-8 is coupled to and extends upwardly from the peripheral portion 104 of the mountable tray 100. In the illustrated example of FIGS. 1-8, the mounting arm 108 of the mountable tray 100 is integrally formed with the peripheral portion 104 of the mountable tray 100 such that no joints, seams, and/or welds exist between the mounting arm 108 and the peripheral portion 104, and/or such that the mounting arm 108 cannot be removed and/or separated from the peripheral portion 104 absent destructive measures. In other examples, the mounting arm 108 can alternatively be coupled to the peripheral portion 104 via one or more permanent, temporary, and/or removable mechanical fasteners(s), adhesive(s), and/or bonding agent(s). In the illustrated example of FIGS. 1-8, the mounting arm 108 is coupled to and extends upwardly from the fourth wall 140 of the peripheral portion 104 of the mountable tray 100. In other examples, the mounting arm 108 can instead be coupled to and extend upwardly from the first wall 134, the second wall 136, or the third wall 138 of the peripheral portion 104 of the mountable tray 100.

Figure 10:
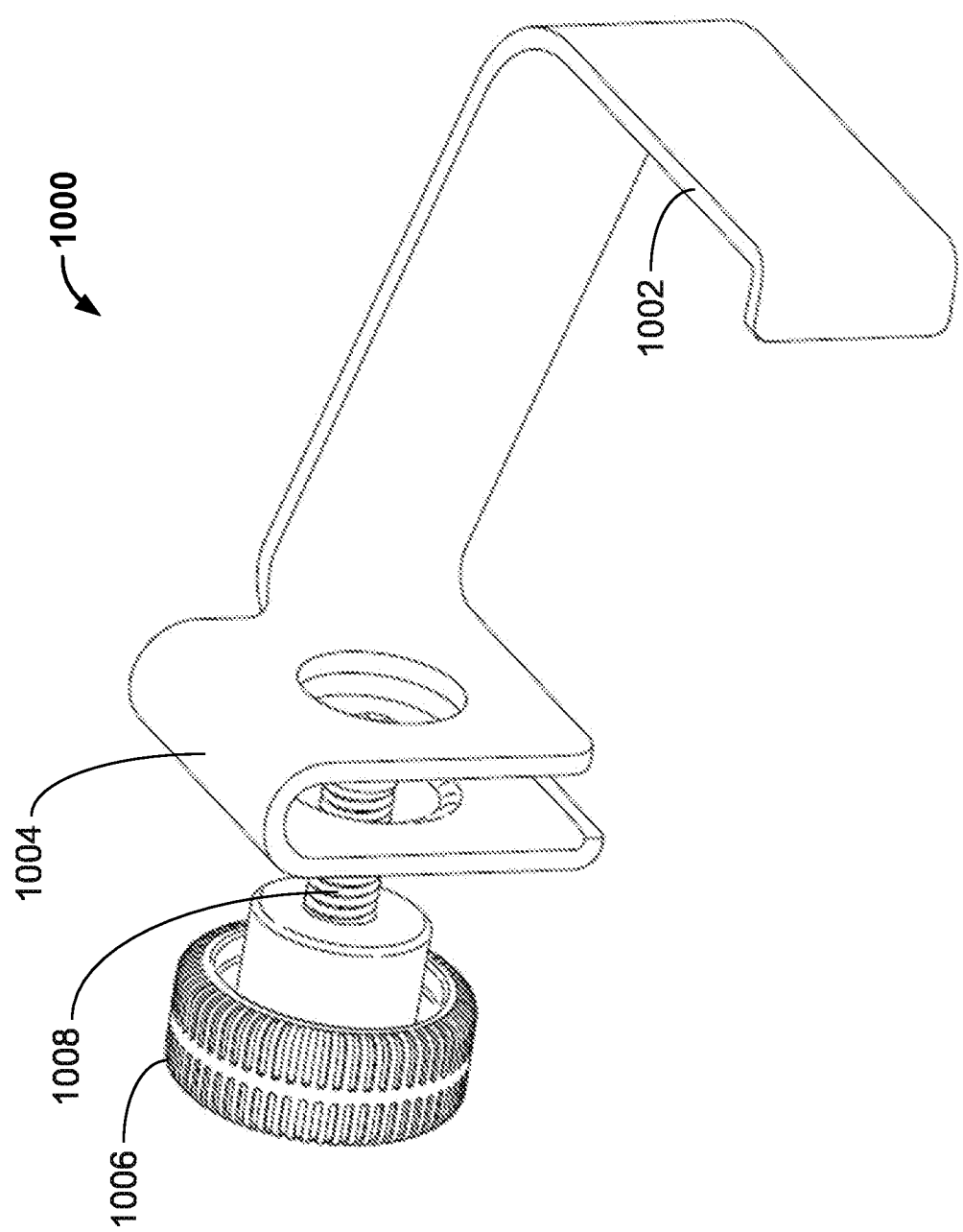
FIG. 10 is a perspective view of an example bracket to which the mountable tray of FIGS. 1-9 can be mounted.
Figure 12:
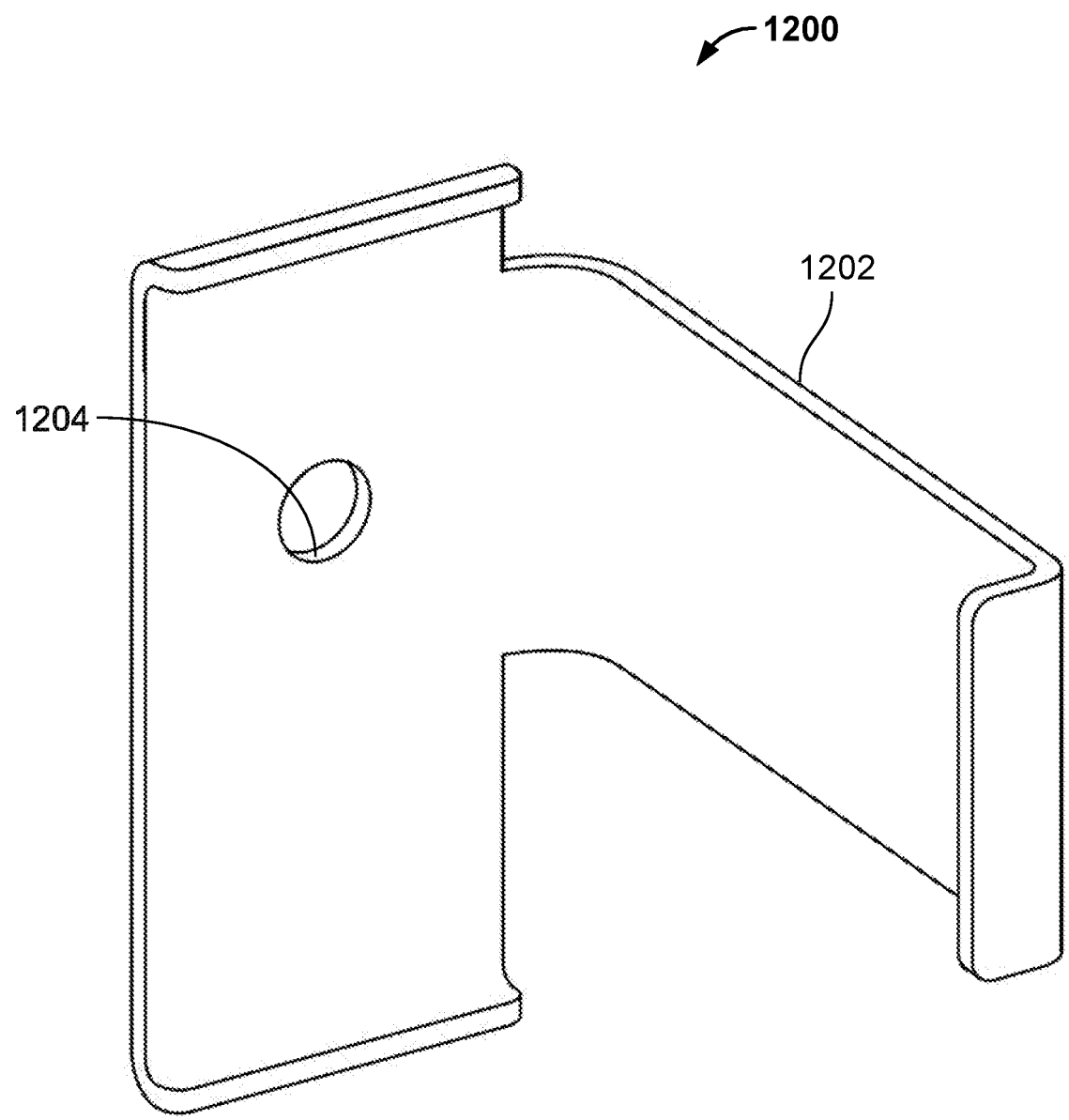
FIG. 12 is a perspective view of another example bracket to which the mountable tray of FIGS. 1-9 can be mounted.

The mounting arm 108 of FIGS. 1-8 is configured (e.g., sized, shaped, and/or structured) to mount the mountable tray 100 of FIGS. 1-8 to a flange of a bracket (e.g., the flange 1002 of the bracket 1000 of FIG. 10, the flange 1202 of the bracket 1200 of FIG. 12, etc.). The mounting arm 108 includes an example first arm 150, an example second arm 152 spaced apart from the first arm 150, and an example bridge 154 coupled to and extending between the first arm 150 and the second arm 152. In the illustrated example of FIGS. 1-8, the bridge 154 of the mounting arm 108 is integrally formed with the first arm 150 and the second arm 152 of the mounting arm 108 such that no joints, seams, and/or welds exist between the bridge 154 on the one hand and the first arm 150 and the second arm 152 on the other hand, and/or such that neither the first arm 150 nor the second arm 152 can be removed and/or separated from the bridge 154 absent destructive measures. In other examples, the bridge 154 can alternatively be coupled to the first arm 150 and/or the second arm 152 via one or more permanent, temporary, and/or removable mechanical fasteners(s), adhesive(s), and/or bonding agent(s).

In the illustrated example of FIGS. 1-8, the first arm 150, the second arm 152, and the bridge 154 of the mounting arm 108 are collectively configured (e.g., sized, shaped, and/or structured) to form an example slot 156 having a downwardly-oriented opening. The slot 156 is configured (e.g., sized, shaped, and/or structured) to receive (e.g., via the downwardly-oriented opening of the slot 156) a flange of a bracket (e.g., the flange 1002 of the bracket 1000 of FIG. 10, the flange 1202 of the bracket 1200 of FIG. 12, etc.). The bridge 154 of the mounting arm 108 prevents the received flange of the bracket from sliding and/or passing upwardly through the mounting arm 108.

The first arm 150 of the mounting arm 108 of FIGS. 1-8 includes an example first fastener opening 158 (e.g., a through hole) extending through the first arm 150. The first fastener opening 158 is configured (e.g., sized, shaped, and/or structured) to have a diameter that enables both a threaded shaft and a head of a fastener (e.g., the threaded shaft 164 and the head 166 of the fastener 112 of FIGS. 1-8) to pass through the first fastener opening 158.

The second arm 152 of the mounting arm 108 of FIGS. 1-8 includes an example second fastener opening 802 (e.g., a through hole) extending through the second arm 152. The second fastener opening 802 is configured (e.g., sized, shaped, and/or structured) to have a diameter that enables the threaded shaft, but not the head of the fastener (e.g., the threaded shaft 164, but not the head 166 of the fastener 112 of FIGS. 1-8) to pass through the second fastener opening 802. The diameter of the second fastener opening 802 of the second arm 152 is accordingly less than the diameter of the first fastener opening 158 of the first arm 150.

A part, portion, and/or segment of the second arm 152 of the mounting arm 108 of FIGS. 1-8 is formed by an example recess 202 that projects outwardly from an example linear portion 204 of the second arm 152 (e.g., in a direction away from the first arm 150 of the mounting arm 108). In the illustrated example of FIGS. 1-8, the recess 202 has a conical profile that is configured (e.g., sized, shaped, and/or structured) to compliment a conical profile of a head of a fastener (e.g., the head of the fastener 112 of FIGS. 1-8) located within the recess 202. In some examples, the second fastener opening 802 of the second arm 152 is located proximate the apex of the recess 202. In such examples, the recess 202 can include an example third fastener opening 804 located at the base of the recess 202 and coaxially aligned with the second fastener opening 802. The third fastener opening 804 is configured (e.g., sized, shaped, and/or structured) to have a diameter that is greater than the diameter of the second fastener opening 802. In some examples, the third fastener opening 804 is configured (e.g., sized, shaped, and/or structured) to have a diameter that enables both the threaded shaft and the head of the fastener (e.g., the threaded shaft 164 and the head 166 of the fastener 112 of FIGS. 1-8) to pass through the third fastener opening 804.

The knob 110 of the mountable tray 100 of FIGS. 1-8 includes an example hand grip 160, an example axle 162 located centrally relative to the hand grip 160, and an example threaded opening 806 (e.g., a threaded bore) formed centrally within the axle 162. The axle 162 of the knob 110 is rigidly coupled to and/or integrally formed with the hand grip 160 of the knob 110 such that rotation of the hand grip 160 causes rotation of the axle 162. In the illustrated example of FIGS. 1-8, the hand grip 160 and the axle 162 respectively have a circular profile. In other examples, the profile of the hand grip 160 and/or the profile of the axle 162 can instead be non-circular. For example, the profile of the hand grip 160 and/or the profile of the axle 162 can be elliptical, triangular, rectangular, trapezoidal, pentagonal, hexagonal, star-shaped, etc.

The fastener 112 of the mountable tray 100 of FIGS. 1-8 includes an example threaded shaft 164 and an example head 166 coupled to and/or integrally formed with the threaded shaft 164. The threaded shaft 164 of the fastener 112 is configured (e.g., sized, shaped, and/or structured) to threadedly mate with the threaded opening 806 of the knob 110. The threaded shaft 164 of the fastener 112 is further configured (e.g., sized, shaped, and/or structured) to have a diameter that is less than the diameter of the first fastener opening 158 of the first arm 150, and also less than the diameter of the second fastener opening 802 of the second arm 152.

The head 166 of the fastener 112 is coupled to and/or integrally formed with the threaded shaft 164 of the fastener 112. In the illustrated example of FIGS. 1-8, the head 166 of the fastener 112 has a conical profile that compliments the conical profile of the recess 202 of the second arm 152 of the mounting arm 108. The head 166 of the fastener 112 is configured (e.g., sized, shaped, and/or structured) to have a diameter that is less than the diameter of the first fastener opening 158 of the first arm 150, but greater than the diameter of the second fastener opening 802 of the second arm 152. In some examples, the head 166 of the fastener includes an example bore 602 that is configured (e.g., sized, shaped, and/or structured) to receive a fastening tool (e.g., an Allen wrench) to facilitate threadedly coupling the threaded shaft 164 of the fastener 112 and the threaded opening 806 of the knob 110.

In the illustrated example of FIGS. 1-8, the fastener 112 of the mountable tray 100 is coupled to the knob 110 of the mountable tray 100. The coupling of the fastener 112 to the knob 110 can be accomplished, for example, by passing the threaded shaft 164 and the head 166 of the fastener 112 through the first fastener opening 158 of the first arm 150 of the mounting arm 108, passing the threaded shaft 164 (but not the head 166) of the fastener 112 through the second fastener opening 802 of the second arm 152 of the mounting arm 108, and threading the threaded shaft 164 of the fastener 112 into the threaded opening 806 of the knob 110. In some examples, the fastener 112 is removably coupled to the knob 110. In other examples, the fastener 112 can instead be permanently coupled to the knob 110. For example, the threaded engagement between the threaded shaft 164 of the fastener 112 and the threaded opening 806 of the knob 110 can be permanently secured through the use of an adhesive and/or bonding agent deposited on the threaded shaft 164 of the fastener 112 and/or deposited within the threaded opening 806 of the knob 110.

When the fastener 112 of the mountable tray 100 is coupled to the knob 110 of the mountable tray 100 (e.g., as shown in FIGS. 1-8), the knob 110 and the fastener 112 collectively form a clamp configured (e.g., sized, shaped, and/or structured) to rigidly mount the mounting arm 108 and/or, more generally, the mountable tray 100 of FIGS. 1-8 to a flange of a bracket (e.g., the flange 1002 of the bracket 1000 of FIG. 10, the flange 1202 of the bracket 1200 of FIG. 12, etc.). For example, a flange of a bracket can be positioned within the slot 156 of the mounting arm 108 (e.g., between the first arm 150 and the second arm 152 of the mounting arm 108) while the head 166 of the fastener 112 is located substantially within the recess 202. In such an example, the head 166 of the fastener 112 is configured (e.g., sized, shaped, and/or structured) to operate as a clamp head that applies a clamping force to the flange of the bracket, and the first arm 150 is configured (e.g., sized, shaped, and/or structured) to operate as a clamp arm against which the flange of the bracket is compressed in response to the applied clamping force. Rotation of the axle 162 of the knob 110 in a first direction (e.g., clockwise) via the hand grip 160 of the knob 110 increases the clamping force applied to the flange of the bracket via the head 166 of the fastener 112. Conversely, rotation of the axle 162 of the knob 110 in a second direction (e.g., counter-clockwise) opposite the first direction via the hand grip 160 of the knob 110 decreases the clamping force applied to the flange of the bracket via the head 166 of the fastener 112.

FIG. 9 is a perspective view of the mountable tray 100 of FIGS. 1-8 holding an example temperature probe hub 900. The temperature probe hub 900 of FIG. 9 is configured (e.g., sized, shaped, and/or structured) in a manner that is substantially identical to the example temperature probe hub commonly described in U.S. Provisional Patent Application No. 62/868,625, filed Jun. 28, 2019, U.S. patent application Ser. No. 16/696,732, filed Nov. 26, 2019, and U.S. patent application Ser. No. 16/696,739, filed Nov. 26, 2019, each of which is hereby incorporated by reference herein in its entirety. In the illustrated example of FIG. 9, an example temperature probe 902 is shown operatively coupled to the temperature probe hub 900. The temperature probe 902 of FIG. 9 includes an example probe shaft 904 having an example free end 906. The free end 906 of the probe shaft 904 has a pointed and/or spiked tip that facilitates inserting the probe shaft 904, free end 906 first, into an item of food (e.g., a piece of meat). The temperature probe 902 of FIG. 9 further includes an example probe cable 908 connected to the probe shaft 904, and an example jack plug 910 connected to the probe cable 908.

As shown in FIG. 9, the jack plug 910 of the temperature probe 902 is plugged into an example probe jack 912 of the temperature probe hub 900. The probe shaft 904 of the temperature probe 902 extends through one of the probe storage openings 148 of the probe storage tab 106 of the mountable tray 100 such that the temperature probe 902 is suspended, held, and/or stored by and/or within the probe storage tab 106. As further shown in FIG. 9, the temperature probe hub 900 is positioned onto and/or within the inner surface 124 of the peripheral portion 104 of the mountable tray 100 such that the temperature probe hub 900 is circumscribed by the peripheral portion 104 of the mountable tray 100.

FIG. 10 is a perspective view of an example bracket 1000 to which the mountable tray 100 of FIGS. 1-9 can be mounted. The bracket 1000 of FIG. 10 includes an example flange 1002 configured (e.g., sized, shaped, and/or structured) to be received and/or positioned within the slot 156 of the mounting arm 108 (e.g., between the first arm 150 and the second arm 152 of the mounting arm 108) of FIGS. 1-9 described above. The bracket 1000 of FIG. 10 further includes an example mounting arm 1004, an example knob 1006, and an example fastener 1008. In the illustrated example of FIG. 10, the mounting arm 1004, the knob 1006, and the fastener 1008 of the bracket 1000 are respectively configured (e.g., sized, shaped, and/or structured) in a manner that is substantially identical to the mounting arm 108, the knob 110, and the fastener 112 of the mountable tray 100 of FIGS. 1-9 described above.

Figure 11:
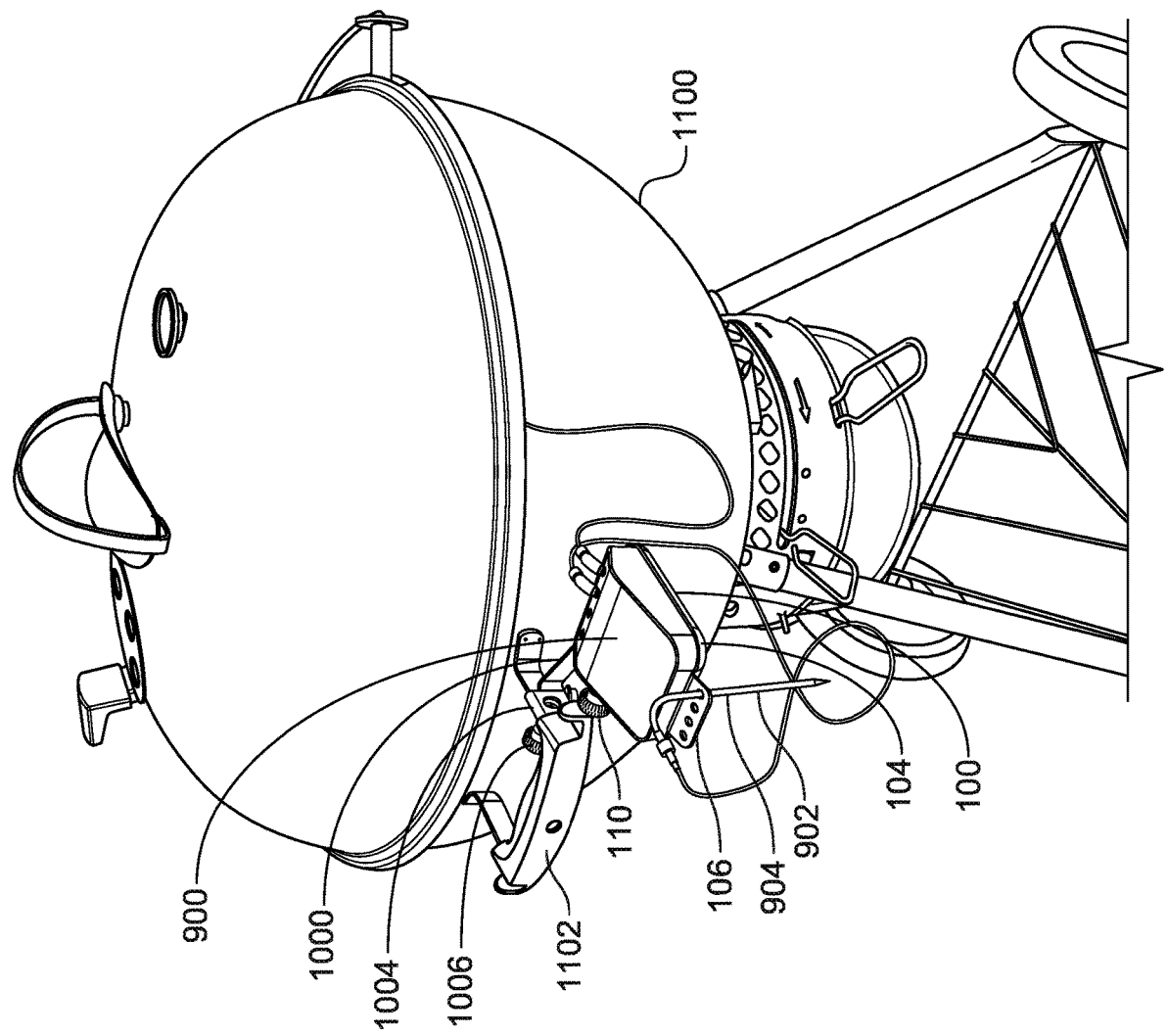
FIG. 11 is a perspective view of the mountable tray of FIGS. 1-9 holding the temperature probe hub of FIG. 9, with the mountable tray mounted to the bracket of FIG. 10, and with the bracket mounted to an example cooking device.

In some examples, the bracket 1000 of FIG. 10 is configured (e.g., sized, shaped, and or structured) to be mounted to a component (e.g., a handle, a flange, etc.) of a cooking device (e.g., an outdoor grill, an outdoor smoker, etc.) via the mounting arm 1004, the knob 1006, and the fastener 1008 of the bracket 1000. For example, FIG. 11 is a perspective view of the mountable tray 100 of FIGS. 1-9 holding the temperature probe hub 900 of FIG. 9, with the mountable tray 100 mounted to the flange 1002 of the bracket 1000 of FIG. 10, and with the bracket 1000 mounted to an example handle 1102 of an example cooking device 1100. In the illustrated example of FIG. 11, the cooking device 1100 is an outdoor kettle-style grill.

In some examples, the mountable tray 100 of FIGS. 1-9 can become mounted to the flange 1002 of the bracket 1000 of FIG. 10 via the mounting arm 108, the knob 110, and the fastener 112 of the mountable tray 100 at a time when the bracket 1000 is already mounted to the component of the cooking device (e.g., the handle 1102 of the cooking device 1100 of FIG. 11) via the mounting arm 1004, the knob 1006, and the fastener 1008 of the bracket 1000. In other examples, the bracket 1000 of FIG. 10 can become mounted to the component of the cooking device (e.g., the handle 1102 of the cooking device 1100 of FIG. 11) via the mounting arm 1004, the knob 1006, and the fastener 1008 of the bracket 1000 at a time when the mountable tray 100 of FIGS. 1-9 is already mounted to the flange 1002 of the bracket 1000 via the mounting arm 108, the knob 110, and the fastener 112 of the mountable tray 100.

FIG. 12 is a perspective view of another example bracket 1200 to which the mountable tray 100 of FIGS. 1-9 can be mounted. The bracket 1200 of FIG. 12 includes an example flange 1202 configured (e.g., sized, shaped, and/or structured) to be received and/or positioned within the slot 156 of the mounting arm 108 (e.g., between the first arm 150 and the second arm 152 of the mounting arm 108) of FIGS. 1-9 described above. The bracket 1200 of FIG. 12 further includes an example opening 1204 configured (e.g., sized, shaped, and/or structured) to receive a fastener (e.g., a screw, a bolt, a rivet, etc.) to mount the bracket 1200 to a component (e.g., a housing, a cooking chamber, etc.) of a cooking device (e.g., an outdoor grill, an outdoor smoker, etc.). In some examples, the mountable tray 100 of FIGS. 1-9 can become mounted to the flange 1202 of the bracket 1200 of FIG. 12 via the mounting arm 108, the knob 110, and the fastener 112 of the mountable tray 100 at a time when the bracket 1200 is already mounted to the component of the cooking device. In other examples, the bracket 1200 of FIG. 12 can become mounted to the component of the cooking device at a time when the mountable tray 100 of FIGS. 1-9 is already mounted to the flange 1202 of the bracket 1200 via the mounting arm 108, the knob 110, and the fastener 112 of the mountable tray 100.

From the foregoing, it will be appreciated that example mountable trays disclosed herein are configured to removably couple a temperature probe hub to a cooking device (e.g., an outdoor grill, an outdoor smoker, etc.) in instances where such a removable coupling would otherwise be infeasible due to the shape, configuration, and/or material properties of the cooking device, and/or due to the shape and/or configuration of the temperature probe hub. In some examples, mountable trays disclosed herein advantageously include a mounting arm configured to mount the mountable tray to a flange of a bracket, with the bracket in turn being mountable to a component (e.g., a handle, a flange, a housing, a cooking chamber, etc.) of a cooking device. In some examples, mountable trays disclosed herein advantageously include a central portion having one or more drainage opening(s) (e.g., one or more through hole(s)) extending therethrough. In such examples, the drainage opening(s) is/are configured to drain fluid (e.g., rainwater, spilled liquid, etc.) from the central portion and/or, more generally, from the mountable tray. In such examples, the drainage opening(s) advantageously prevent(s) fluid deposited onto the central portion and/or within the mountable tray from collecting within the mountable tray. In some examples, mountable trays disclosed herein advantageously include a probe storage tab having one or more probe storage opening(s) (e.g., one or more through hole(s)) extending therethrough. In such examples, each probe storage opening is configured to receive a temperature probe of a temperature probe hub, and to prevent the received temperature probe from sliding through the probe storage opening. In such examples, each probe storage opening is advantageously configured to suspend and/or hold the received temperature probe within the probe storage tab. In the absence of the probe storage tab of the mountable tray, the temperature probe may otherwise be left to dangle and/or hang from the temperature probe hub when the temperature probe is coupled to the temperature probe hub and not in use.

In some examples, a mountable tray is disclosed. In some disclosed examples, the mountable tray comprises a central portion, a peripheral portion, and a mounting arm. In some disclosed examples, the central portion includes at least one drainage opening extending through the central portion. In some disclosed examples, the peripheral portion is coupled to and extends upwardly from the central portion. In some disclosed examples, the mounting arm is coupled to and extends upwardly from the peripheral portion. In some disclosed examples, the mounting arm is configured to mount the mountable tray to a flange.

In some disclosed examples, the at least one drainage opening is a slot. In some disclosed examples, the slot has an L-shaped profile.

In some disclosed examples, the central portion has a rectangular profile including rounded corners. In some disclosed examples, the at least one drainage opening includes a first drainage opening located proximate a first one of the rounded corners, a second drainage opening located proximate a second one of the rounded corners, a third drainage opening located proximate a third one of the rounded corners, and a fourth drainage opening located proximate a fourth one of the rounded corners.

In some disclosed examples, the mountable tray further comprises a probe storage tab coupled to and extending outwardly from the peripheral portion. In some disclosed examples, the probe storage tab includes at least one probe storage opening extending through the probe storage tab and configured to receive a temperature probe. In some disclosed examples, the probe storage tab extends outwardly from the peripheral portion at a downward angle.

In some disclosed examples, the peripheral portion circumscribes the central portion. In some disclosed examples, the peripheral portion is configured to support and circumscribe a temperature probe hub when the temperature probe hub is positioned onto an inner surface of the peripheral portion.

In some disclosed examples, the mounting arm includes a first arm, a second arm, and a bridge. In some disclosed examples, the first arm is coupled to and extends upwardly from the peripheral portion. In some disclosed examples, the first arm has a first fastener opening. In some disclosed examples, the first fastener opening has a first diameter. In some disclosed examples, the second arm is spaced apart from the first arm. In some disclosed examples, the second arm has a second fastener opening. In some disclosed examples, the second fastener opening has a second diameter. In some disclosed examples, the second diameter is less than the first diameter. In some disclosed examples, the bridge is coupled to and extends between the first arm and the second arm.

In some disclosed examples, the mountable tray further includes a knob and a fastener. In some disclosed examples, the knob includes a threaded opening. In some disclosed examples, the fastener includes a threaded shaft and a head coupled to the threaded shaft. In some disclosed examples, the threaded shaft is configured to threadedly mate with the threaded opening. In some disclosed examples, the threaded shaft has a third diameter. In some disclosed examples, the third diameter is less than the second diameter. In some disclosed examples, the head has a fourth diameter. In some disclosed examples, the fourth diameter is less than the first diameter and greater than the second diameter.

In some examples, a mountable tray is disclosed. In some disclosed examples, the mountable tray comprises a central portion, a peripheral portion, a probe storage tab, and a mounting arm. In some disclosed examples, the peripheral portion extends upwardly from the central portion. In some disclosed examples, the probe storage tab is coupled to and extends outwardly from the peripheral portion. In some disclosed examples, the probe storage tab includes at least one probe storage opening extending through the probe storage tab and configured to receive a temperature probe. In some disclosed examples, the mounting arm is coupled to and extends upwardly from the peripheral portion. In some disclosed examples, the mounting arm is configured to mount the mountable tray to a flange.

In some disclosed examples, the probe storage tab extends outwardly from the peripheral portion at a downward angle.

In some disclosed examples, the central portion includes at least one drainage opening extending through the central portion.

In some disclosed examples, the at least one drainage opening is a slot. In some disclosed examples, the slot has an L-shaped profile.

In some disclosed examples, the central portion has a rectangular profile including rounded corners. In some disclosed examples, the at least one drainage opening includes a first drainage opening located proximate a first one of the rounded corners, a second drainage opening located proximate a second one of the rounded corners, a third drainage opening located proximate a third one of the rounded corners, and a fourth drainage opening located proximate a fourth one of the rounded corners.

In some disclosed examples, the peripheral portion circumscribes the central portion. In some disclosed examples, the peripheral portion is configured to support and circumscribe a temperature probe hub when the temperature probe hub is positioned onto an inner surface of the peripheral portion.

In some disclosed examples, the mounting arm includes a first arm, a second arm, and a bridge. In some disclosed examples, the first arm is coupled to and extends upwardly from the peripheral portion. In some disclosed examples, the first arm has a first fastener opening. In some disclosed examples, the first fastener opening has a first diameter. In some disclosed examples, the second arm is spaced apart from the first arm. In some disclosed examples, the second arm has a second fastener opening. In some disclosed examples, the second fastener opening has a second diameter. In some disclosed examples, the second diameter is less than the first diameter. In some disclosed examples, the bridge is coupled to and extends between the first arm and the second arm.

In some disclosed examples, the mountable tray further includes a knob and a fastener. In some disclosed examples, the knob includes a threaded opening. In some disclosed examples, the fastener includes a threaded shaft and a head coupled to the threaded shaft. In some disclosed examples, the threaded shaft is configured to threadedly mate with the threaded opening. In some disclosed examples, the threaded shaft has a third diameter. In some disclosed examples, the third diameter is less than the second diameter. In some disclosed examples, the head has a fourth diameter. In some disclosed examples, the fourth diameter is less than the first diameter and greater than the second diameter.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A mountable tray, comprising:
   a central portion including at least one drainage opening extending through the central portion;
   a peripheral portion coupled to and extending upwardly from the central portion; and
   a mounting arm coupled to and extending upwardly from the peripheral portion, the mounting arm configured to mount the mountable tray to a flange, the mounting arm including:

a first arm coupled to and extending upwardly from the peripheral portion, the first arm having a first fastener opening, the first fastener opening having a first diameter;

a second arm spaced apart from the first arm, the second arm having a second fastener opening, the second fastener opening having a second diameter, the second diameter being less than the first diameter; and a bridge coupled to and extending between the first arm and the second arm.

2. The mountable tray of claim 1, wherein the at least one drainage opening is a slot.

3. The mountable tray of claim 2, wherein the slot has an L-shaped profile.

4. The mountable tray of claim 1, wherein the central portion has a rectangular profile including rounded corners.

5. The mountable tray of claim 4, wherein the at least one drainage opening includes a first drainage opening located proximate a first one of the rounded corners, a second drainage opening located proximate a second one of the rounded corners, a third drainage opening located proximate a third one of the rounded corners, and a fourth drainage opening located proximate a fourth one of the rounded corners.

6. The mountable tray of claim 1, further comprising:
a knob including a threaded opening; and
a fastener including a threaded shaft and a head coupled to the threaded shaft, the threaded shaft configured to threadedly mate with the threaded opening, the threaded shaft having a third diameter, the third diameter being less than the second diameter, the head having a fourth diameter, the fourth diameter being less than the first diameter and greater than the second diameter.

7. A mountable tray, comprising:
a central portion;
a peripheral portion extending upwardly from the central portion;
a probe storage tab coupled to and extending outwardly from the peripheral portion, the probe storage tab including at least one probe storage opening extending through the probe storage tab and configured to receive a temperature probe; and
a mounting arm coupled to and extending upwardly from the peripheral portion, the mounting arm configured to mount the mountable tray to a flange, the mounting arm including:

a first arm coupled to and extending upwardly from the peripheral portion, the first arm having a first fastener opening, the first fastener opening having a first diameter;

a second arm spaced apart from the first arm, the second arm having a second fastener opening, the second fastener opening having a second diameter, the second diameter being less than the first diameter; and a bridge coupled to and extending between the first arm and the second arm.

8. The mountable tray of claim 7, wherein the central portion includes at least one drainage opening extending through the central portion.

9. The mountable tray of claim 8, wherein the at least one drainage opening is a slot.

10. The mountable tray of claim 9, wherein the slot has an L-shaped profile.

11. The mountable tray of claim 8, wherein the central portion has a rectangular profile including rounded corners.

12. The mountable tray of claim 11, wherein the at least one drainage opening includes a first drainage opening located proximate a first one of the rounded corners, a second drainage opening located proximate a second one of the rounded corners, a third drainage opening located proximate a third one of the rounded corners, and a fourth drainage opening located proximate a fourth one of the rounded corners.

13. The mountable tray of claim 7, further comprising:
a knob including a threaded opening; and
a fastener including a threaded shaft and a head coupled to the threaded shaft, the threaded shaft configured to threadedly mate with the threaded opening, the threaded shaft having a third diameter, the third diameter being less than the second diameter, the head having a fourth diameter, the fourth diameter being less than the first diameter and greater than the second diameter.

14. The mountable tray of claim 1, wherein the peripheral portion circumscribes the central portion, and wherein the peripheral portion is configured to support and circumscribe a temperature probe hub when the temperature probe hub is positioned onto an inner surface of the peripheral portion.

15. The mountable tray of claim 7, wherein the peripheral portion circumscribes the central portion, and wherein the peripheral portion is configured to support and circumscribe a temperature probe hub when the temperature probe hub is positioned onto an inner surface of the peripheral portion.

* * * * *